United States Patent
Xu et al.

(10) Patent No.: US 10,540,823 B2
(45) Date of Patent: Jan. 21, 2020

(54) METHOD AND APPARATUS FOR DETERMINING A PLANAR SURFACE

(71) Applicants: BEIJING JINGDONG SHANGKE INFORMATION TECHNOLOGY CO., LTD., Beijing (CN); JD.com AMERICAN TECHNOLOGIES CORPORATION, Santa Clara, CA (US)

(72) Inventors: Yi Xu, Menlo Park, CA (US); Hui Zhou, Sunnyvale, CA (US)

(73) Assignees: Beijing Jingdong Shangke Information Technology Co., Ltd., Beijing (CN); JD.com American Technologies Corporation, Santa Clara, CA (US)

( * ) Notice: Subject to any disclaimer, the term of this patent is extended or adjusted under 35 U.S.C. 154(b) by 41 days.

(21) Appl. No.: 15/900,015

(22) Filed: Feb. 20, 2018

(65) Prior Publication Data

US 2019/0259215 A1    Aug. 22, 2019

(51) Int. Cl.
G06T 19/20 (2011.01)
G06T 15/20 (2011.01)
G06T 17/20 (2006.01)
G06T 7/73 (2017.01)

(52) U.S. Cl.
CPC ............ G06T 19/20 (2013.01); G06T 7/74 (2017.01); G06T 15/205 (2013.01); G06T 17/20 (2013.01); G06T 2207/10012 (2013.01); G06T 2207/30244 (2013.01); G06T 2219/008 (2013.01)

(58) Field of Classification Search
CPC ......... G06T 19/20; G06T 7/74; G06T 15/205; G06T 17/20; G06T 2207/10012; G06T 2207/30244; G06T 2219/008
See application file for complete search history.

(56) References Cited

U.S. PATENT DOCUMENTS

| | | | |
|---|---|---|---|
| 2008/0144925 A1* | 6/2008 | Zhu | G06K 9/32 382/154 |
| 2016/0093058 A1* | 3/2016 | Moteki | G06T 7/73 382/154 |
| 2019/0066321 A1* | 2/2019 | Evers-Senne | G06T 7/60 |

\* cited by examiner

*Primary Examiner* — Chong Wu
(74) *Attorney, Agent, or Firm* — RatnerPrestia

(57) ABSTRACT

Embodiments of the present disclosure disclose a method and an apparatus for determining a planar surface. A specific embodiment of the method comprises: determining, from obtained images of the environment that include a to-be-determined planar surface, feature points belonging to the to-be-determined planar surface; judging whether the number of the feature points belonging to the to-be-determined planar surface is smaller than a preset number threshold; if yes, generating first prompt information for prompting a user to add feature points on the to-be-determined planar surface; obtaining at least two first images including the added feature points; and in response to the number of the feature points belonging to the to-be-determined planar surface in the first images being no less than the preset number threshold, reconstructing the to-be-determined planar surface based on the first images so as to determine a location and an orientation of the to-be-determined planar surface. This embodiment implements reconstruction of a weakly-textured or texture-less planar surface.

20 Claims, 8 Drawing Sheets

METHOD AND APPARATUS FOR DETERMINING A PLANAR SURFACE

TECHNICAL FIELD

Embodiments of the present disclosure relate to the technical field of image processing, specifically to the technical field of three-dimensional reconstruction, and more particularly to a method and apparatus for determining a planar surface.

BACKGROUND

Three-dimension reconstruction (3D reconstruction) refers to building a mathematic model suitable for computer representation and processing for a three-dimensional object, which is the basis for processing and manipulating the three-dimensional object and analyzing its properties in a computer environment and is also a key technology to build a virtual reality representing the real world in the computer.

The 3D reconstruction is applied in a wide variety of fields. With constant development of sciences and technologies, the 3D reconstruction is gradually developing into a core technology in fields such as Computer Aided Geometric Design (CAGD), Computer Graphics, Computer Animation, Computer Vision, medical imaging, computational science, Virtual Reality, Augmented Reality and digital media, etc.

SUMMARY

An objective of the embodiments of the present disclosure is to provide a method and an apparatus for determining a planar surface.

In a first aspect, an embodiment of the present disclosure provides a method for determining a planar surface, the method comprising: determining, from obtained images of the environment that include a to-be-determined planar surface, feature points belonging to the to-be-determined planar surface; judging whether the number of the feature points belonging to the to-be-determined planar surface is smaller than a preset number threshold; if yes, generating first prompt information for prompting a user to add feature points on the to-be-determined planar surface; obtaining at least two first images including the added feature points; and in response to the number of the feature points belonging to the to-be-determined planar surface in the first images being no less than the preset number threshold, reconstructing the to-be-determined planar surface based on the first images, so as to determine a position and an orientation of the to-be-determined planar surface.

In some embodiments, before determining, from obtained images of the environment that include a to-be-determined planar surface, feature points belonging to the to-be-determined planar surface, the method further comprises: obtaining the images of the environment, wherein at least two of the obtained images of the environment include the to-be-determined planar surface; performing three-dimensional reconstruction of the environment including the to-be-determined planar surface based on the obtained images so as to generate a three-dimensional point set of the environment; and in response to the number of the feature points belonging to the to-be-determined planar surface in the first images being no less than the preset number threshold, reconstructing the to-be-determined planar surface based on the first images so as to determine a position and an orientation of the to-be-determined planar surface, comprises: in response to the number of the feature points belonging to the to-be-determined planar surface in the first images being no less than the preset number threshold, reconstructing the to-be-determined planar surface based on the first images so as to determine a position and an orientation of the to-be-determined planar surface in the three-dimensional environment.

In some embodiments, after performing three-dimensional reconstruction of an environment including the to-be-determined planar surface based on the obtained images of the environment so as to generate a three-dimensional point set of the environment, the method further comprises: generating second prompt information for prompting the user to move an image acquiring apparatus for acquiring images along the direction towards the to-be-determined planar surface.

In some embodiments, in response to the number of the feature points belonging to the to-be-determined planar surface in the first images being no less than the preset number threshold, reconstructing the to-be-determined planar surface based on the first images so as to determine a position and an orientation of the to-be-determined planar surface, comprises: determining 3D coordinates of the feature points in the three-dimensional environment; and determining a plane equation of the to-be-determined planar surface using a preset algorithm based on the 3D coordinates of the feature points.

In some embodiments, the preset algorithm includes any one of: Least Squares approach, Random Sample Consensus algorithm, and 3-D Kernel-based Hough Transform algorithm.

In some embodiments, determining 3D coordinates of the feature points in the three-dimensional environment comprises: determining position and orientation of the image acquiring apparatus in the three-dimensional environment using the Visual Inertial Odometry (VIO); and determining the 3D coordinates of the feature points in the three-dimensional environment based on the position and orientation of the image acquiring apparatus in the three-dimensional environment.

In some embodiments, performing three-dimensional reconstruction of an environment including the to-be-determined planar surface based on the obtained images of the environment so as to generate a three-dimensional point set of the three-dimensional environment, comprises: determining, for each feature point in the three-dimension environment, at least two images including the feature point; determining the orientation of the image acquiring apparatus and the position of the image acquiring apparatus in the three-dimensional environment upon acquiring the at least two images; determining the location of the feature point in the three-dimensional environment based on the orientation of the image acquiring apparatus and the position of the image acquiring apparatus in the three-dimensional environment upon acquiring the at least two images.

In some embodiments, the first prompt information is configured for prompting the user to attach a planar object to the to-be-determined planar surface so as to add feature points to the to-be-determined planar surface.

In some embodiments, the first prompt information is configured for prompting the user to attach a hand of the user to the to-be-determined planar surface so as to use points on the hand of the user as the added feature points. In some embodiments, the points on the hand of the user can be finger tips.

In a second aspect, the present disclosure further provides an electronic device, comprising: an image acquiring apparatus for acquiring images; one or more processors; a memory for storing one or more programs which, when being executed by the one or more processors, cause the one or more processors to implement the method according to the first aspect.

In some embodiments, the electronic device further comprises a pose determining unit that is configured for determining a position and an orientation of the image acquiring apparatus.

In some embodiments, the pose determining unit comprises a visual inertial odometry system that uses visual sensors and inertial sensors.

In some embodiments, before determining, from obtained images of the environment that include a to-be-determined planar surface, feature points belonging to the to-be-determined planar surface, the one or more processors are further configured for, obtaining the images of the environment, wherein at least two of the obtained images of the environment includes the to-be-determined planar surface; performing three-dimensional reconstruction of the environment including the to-be-determined planar surface based on the obtained images so as to generate a three-dimensional point set of the environment; and in response to the number of feature points belonging to the to-be-determined planar surface in the first images being no less than the preset number threshold, reconstructing the to-be-determined planar surface based on the first images so as to determine a position and an orientation of the to-be-determined planar surface in the three-dimensional environment.

In some embodiments, after performing three-dimensional reconstruction of an environment including the to-be-determined planar surface based on the obtained images of the environment so as to generate a three-dimensional point set of the environment, the one or more processors are further configured for, after performing three-dimensional reconstruction of an environment including the to-be-determined planar surface based on the obtained images of the environment so as to generate a three-dimensional point set of the environment, generating second prompt information for prompting the user to move an image acquiring apparatus for acquiring images along the direction towards the to-be-determined planar surface.

In some embodiments, response to the number of the feature points belonging to the to-be-determined planar surface in the first images being no less than the preset number threshold, reconstructing the to-be-determined planar surface based on the first images so as to determine a position and an orientation of the to-be-determined planar surface, the one or more processors are further configured for, determining 3D coordinates of the feature points in the three-dimensional environment; and determining a plane equation of the to-be-determined planar surface using a preset algorithm based on the 3D coordinates of the feature points.

In some embodiments, when determining 3D coordinates of the feature points in the three-dimensional environment, the one or more processors are further configured for, determining position and orientation of the image acquiring apparatus in the three-dimensional environment using the Visual Inertial Odometry; and determining the 3D coordinates of the feature points in the three-dimensional environment based on the position and orientation of the image acquiring apparatus in the three-dimensional environment.

In some embodiments, when performing three-dimensional reconstruction of an environment including the to-be-determined planar surface based on the obtained images of an environment so as to generate a three-dimensional point set, the one or more processors are further configured for, determining, for each feature point in the three-dimensional environment, at least two images including the feature point; determining the orientations of the image acquiring apparatus and the positions of the image acquiring apparatus in the three-dimensional environment upon acquiring the at least two images; and determining the location of the feature point in the three-dimensional environment based on the orientations of the image acquiring apparatus and the positions of the image acquiring apparatus in the three-dimensional environment upon acquiring the at least two images.

In a third aspect, the present disclosure further provides a computer-readable storage medium on which a computer program is stored, wherein the program, when being executed, implements the method comprising: determining, from obtained images of the environment that include a to-be-determined planar surface, feature points belonging to the to-be-determined planar surface; judging whether the number of the feature points belonging to the to-be-determined planar surface is smaller than a preset number threshold; if yes, generating first prompt information for prompting a user to add feature points on the to-be-determined planar surface; obtaining at least two first images including the added feature points; and in response to the number of the feature points belonging to the to-be-determined planar surface in the first images being no less than the preset number threshold, reconstructing the to-be-determined planar surface based on the first images so as to determine a position and an orientation of the to-be-determined planar surface.

In some embodiments, before determining, from obtained images of the environment that include a to-be-determined planar surface, feature points belonging to the to-be-determined planar surface, the method further comprises:obtaining the images of the environment, wherein at least two of the obtained images of the environment includes the to-be-determined planar surface; performing three-dimensional reconstruction of the environment including the to-be-determined planar surface based on the obtained images so as to generate a three-dimensional point set of the environment; and in response to the number of the feature points belonging to the to-be-determined planar surface in the first images being no less than the preset number threshold, reconstructing the to-be-determined planar surface based on the first images so as to determine a position and an orientation of the to-be-determined planar surface, comprises: in response to the number of feature points belonging to the to-be-determined planar surface in the first images being no less than the preset number threshold, reconstructing the to-be-determined planar surface based on the first images so as to determine a position and an orientation of the to-be-determined planar surface in the three-dimensional environment.

In some embodiments, in response to the number of the feature points belonging to the to-be-determined planar surface in the first images being no less than the preset number threshold, reconstructing the to-be-determined planar surface based on the first images so as to determine a position and an orientation of the to-be-determined planar surface, comprises: determining 3D coordinates of the feature points in the three-dimensional environment; and determining a plane equation of the to-be-determined planar surface using a preset algorithm based on the 3D coordinates of the feature points.

According to the method and apparatus for determining a planar surface as provided by the embodiments of the present disclosure, firstly, first prompt information is generated when the number of feature points belonging to a to-be-determined planar surface is smaller than a preset threshold, to thereby prompt a user to add feature points to the to-be-determined planar surface; then, at least two first images including the added feature points are obtained, based on which first images, the to-be-determined planar surface is reconstructed to determine a position and an orientation of the to-be-determined planar surface. In this way, for a weakly-textured or texture-less planar surface, by adding feature points on such a surface, the position and orientation of the planar surface may be determined based on these feature points, thereby completing reconstruction of the planar surface.

BRIEF DESCRIPTION OF THE DRAWINGS

Other features, objectives and advantages of the present disclosure will become more apparent through reading the detailed description of non-limiting embodiments with reference to the accompanying drawings.

DETAILED DESCRIPTION OF THE PREFERRED EMBODIMENTS

Hereinafter, the present disclosure will be described in further detail with reference to the accompanying drawings and the embodiments. It will be appreciated that the preferred embodiments described herein are only for illustration, rather than limiting the present disclosure. In addition, it should also be noted that for the ease of description, the drawings only illustrate those parts related to the present disclosure.

It needs to be noted that without conflicts, the embodiments in the present disclosure and the features in the embodiments may be combined with each other. Hereinafter, the present disclosure will be illustrated in detail with reference to the accompanying drawings in conjunction with the embodiments.

Figure 1:
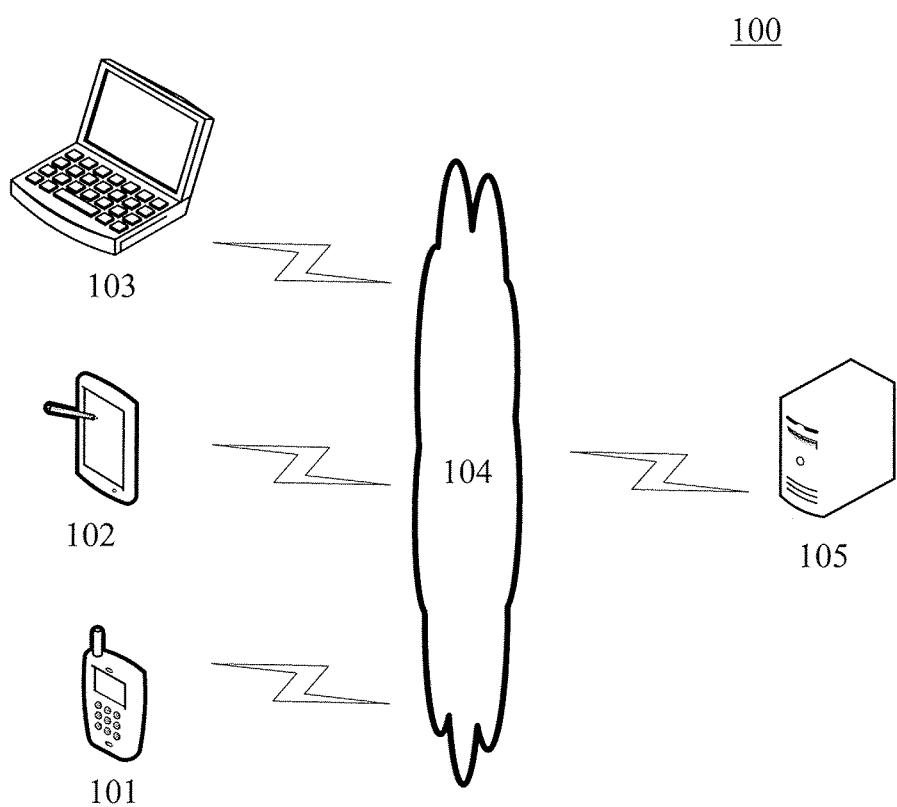
FIG. 1 is an exemplary system architecture diagram in which the present disclosure may be applied.

FIG. 1 illustrates an exemplary system architecture 100 in which an embodiment of a method for determining a planar surface or an embodiment of an apparatus for determining a planar surface in the present disclosure may be applied.

As illustrated in FIG. 1, the system architecture 100 may comprise terminal devices 101, 102, and 103, a network 104, and a server 105. The network 104 is a medium for providing a communication link between the terminal devices 101, 102, and 103 and the server 105. The network 104 may include various kinds of connection types, e.g., a wired communication link, a wireless communication link, or an optical fiber cable, etc.

The user may interact with the server 105 using the terminal devices 101, 102, 103 over the network 104, to receive or transmit messages, etc. The terminal devices 101, 102, and 103 may be installed with various kinds of communication client applications, e.g., image processing applications, web browser applications, search applications, game applications, and social platform software, etc.

The terminal devices 101, 102, 103 may be various kinds of electronic devices that have a display screen and an image acquisition function, including, but not limited to, a smart phone, a tablet computer, a laptop computer, and a desktop computer, etc.

The server 105 may be a server that provides various kinds of services, e.g., an image processing server that performs three-dimensional reconstruction based on two-dimensional images acquired by the terminal devices 101, 102, and 103. The image processing server may perform processing such as analyzing data like the obtained two-dimensional images, and feed back a processing result (e.g., three-dimensional point set data generated from the reconstruction) to the terminal devices.

It needs to be noted that the method for determining a planar surface provided by an embodiment of the present disclosure may be executed by the server 105, or executed partially by the terminal devices 101, 102, and 103 while the remaining parts are executed by the server 105, or executed entirely by the terminal devices 101, 102, 103. Correspondingly, the apparatus for determining a planar surface may be provided in the server 105, or part of modules thereof are provided in the terminal devices 101, 102, and 103 while the other parts are provided in the server 105, or provided entirely in the devices 101, 102, and 103.

It should be understood that the numbers of terminal devices, networks, and servers in FIG. 1 are only schematic. Any numbers of electronic devices, networks, and servers may be provided according to implementation needs.

Figure 2:
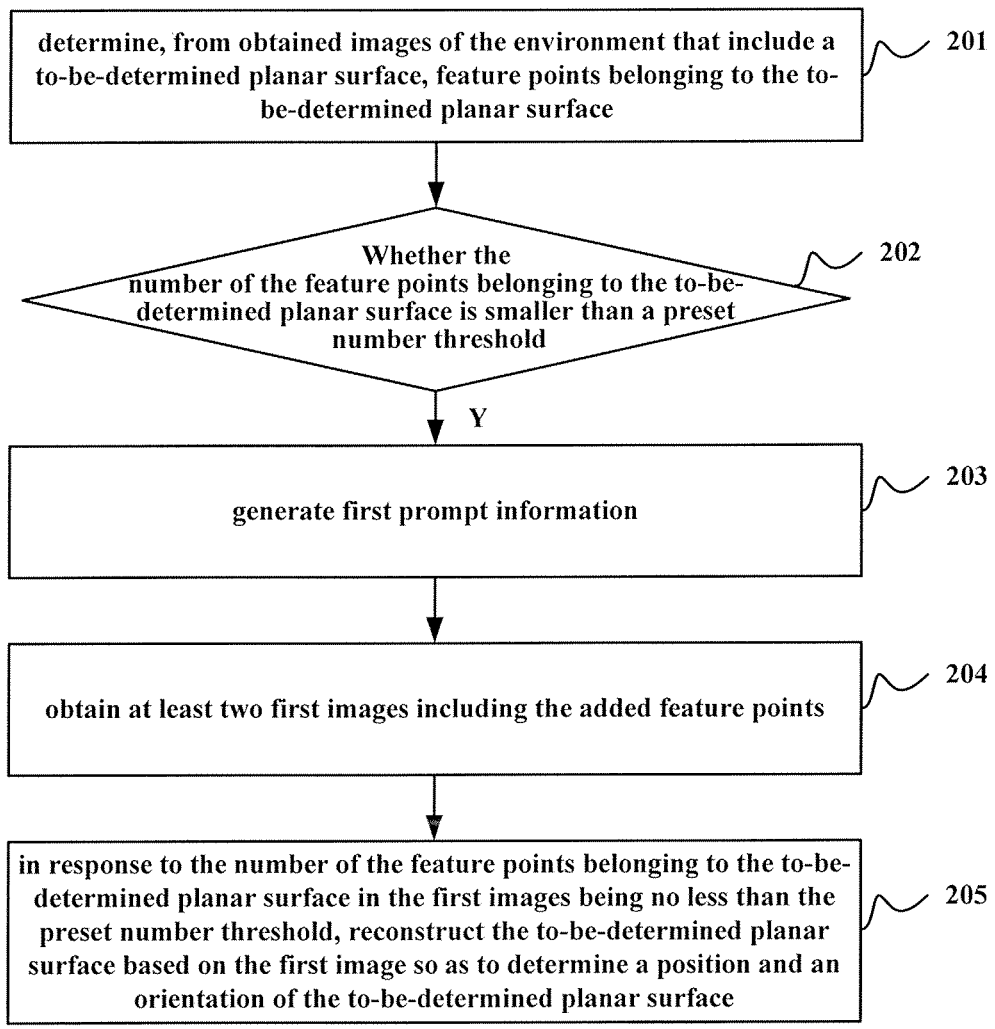
FIG. 2 is a flow chart of an embodiment of a method for determining a planar surface according to the present disclosure.

Continue to refer to FIG. 2, which shows a flow 200 of an embodiment of a method for determining a planar surface according to the present disclosure. The method for determining a planar surface comprises steps of:

Step 201: determining, from obtained images of the environment that include a to-be-determined planar surface, feature points belonging to the to-be-determined planar surface.

In this embodiment, an electronic device on which the method for determining a planar surface is executed may obtain, through an image acquiring unit provided thereon, images of the environment including the to-be-determined planar surface, or acquire, through an image acquiring apparatus in communicative connection with the electronic device, the images of the environment including the to-be-determined planar surface, and then the image acquiring apparatus sends the acquired images of the environment including the to-be-determined planar surface to the electronic device.

For example, in some application scenarios, the electronic device on which the method for determining a planar surface is executed may be a terminal device in FIG. 1. In these application scenarios, the terminal device may obtain images of the environment including the to-be-determined planar surface using an image acquiring unit such as a camera provided thereon.

Or, in some other application scenarios, the electronic device on which the method for determining a planar surface is executed may be the server in FIG. 1. In these application scenarios, the server may send an image acquisition instruction to an image acquiring apparatus in communicative connection therewith, causing the image acquiring apparatus to acquire images of the environment including the to-be-determined planar surface, and send the acquired images including the to-be-determined planar surface to the server in a wired connection manner or a wireless connection manner. It needs to be noted that the wireless connection manner may include, but not limited to, a 3G/4G connection, a WiFi connection, a Bluetooth connection, a WiMAX connection, a Zigbee connection, a UWB (ultra wideband) connection, and other currently known or future developed wireless connection manners.

Here, a feature point of an image may be construed as a point with a distinctive feature in an image, which may effectively reflect substantive characteristics of the image and identify a target object in the image. Correspondingly, a feature point belonging to a to-be-determined planar surface may be construed as a point that may effectively reflect a feature of the to-be-determined planar surface and may identify the to-be-determined planar surface.

Here, a variety of feasible image feature point extraction algorithms can be used to extract feature points. For example, a SIFT (Scale-Invariant Feature Transform) algorithm, which is invariant to rotation, scaling, and illumination changes and robust against changes in viewing angle, affine transformation, and noise to a certain extent. For another example, a SURF (Speeded Up Robust Features) algorithm. The SURF algorithm as an improvement of the SIFT algorithm further enhances algorithm execution efficiency and provides a possibility for algorithm application in a real-time computer vision system. The SIFT algorithm and the SURF algorithm are image feature point extraction algorithms that have been widely studied in the prior art, which will not be detailed here. It may be understood that in this embodiment, any currently existing or future developed algorithms may be exploited to extract the feature points of the to-be-determined planar surface.

In some application scenarios, for example, firstly, feature points included in the images of the environment may be determined from the obtained images using a feature extraction algorithm, and then whether the feature points belonging to the to-be-determined planar surface are present in the determined feature points is determined. For example, locations of the feature points in a 3D environment are determined by obtaining depth information of the extracted feature points. Here, the depth information may be characterized by a distance between a feature point and a vertical plane where the image acquiring apparatus or image acquiring unit is located.

Step 202: judging whether the number of the feature points belonging to the to-be-determined planar surface is smaller than a preset number threshold.

In some application scenarios, the feature extraction algorithm may determine, from the obtained images of the environment, relatively more feature points belonging to the to-be-determined planar surface. In these application scenarios, a plane equation of the to-be-determined planar surface may be determined by first determining locations (e.g., coordinate values under a preset three-dimensional Cartesian coordinate system) of these feature points belonging to the to-be-determined planar surface in a three-dimensional environment, thereby completing reconstruction of the to-be-determined planar surface.

In some application scenarios, the to-be-determined surface may be a weakly-textured or texture-less planar surface. For example, the to-be-determined planar surface may be a uniformly colored wall surface, a desk top, and a ground surface, etc. In these application scenarios, it is possible that the feature extraction algorithm above cannot determine any feature points belonging to the to-be-determined planar surface from the obtained images of the environment, or the feature points determined from the obtained images of the environment belonging to the to-be-determined planar surface are relatively fewer, such that it is impossible to reconstruct the to-be-determined planar surface from these feature points belonging to the to-be-determined planar surface.

Step 203: if yes, generating first prompt information for prompting a user to add feature points on the to-be-determined planar surface.

In some application scenarios, the electronic device on which the method for determining a planar surface is executed may be a terminal device in FIG. 1. In these application scenarios, the terminal device may generate first prompt information such that the generated first prompt information is rendered by a display of the terminal device and/or played by a voice output unit of the terminal device.

Or, in some other application scenarios, the electronic device on which the method for determining a planar surface is executed may be the server in FIG. 1. In these application scenarios, the server may send the generated first prompt information to the terminal device used by the user, such that the generated first prompt information is rendered by a display of the terminal device and/or played by a voice output unit of the terminal device.

Step 204: obtaining at least two first images that include the added feature points.

In some application scenarios, after receiving the first prompt information, the user may manually add some feature points on the to-be-determined planar surface, for example, adding, on a uniformly colored wall surface, a planar object that has texture or color different from the background color of the wall surface.

Step 205: in response to the number of the feature points belonging to the to-be-determined planar surface in the first images being no less than the preset number threshold, reconstructing the to-be-determined planar surface based on the first images so as to determine a position and an orientation of the to-be-determined planar surface.

If the number of the feature points belonging to the to-be-determined planar surface after adding feature points on the to-be-determined planar surface is no less than the preset number threshold, the to-be-determined planar surface may be reconstructed based on these added feature points in the first images, thereby determining the position and orientation of the to-be-determined planar surface.

In some application scenarios, at least two first images may be obtained, and these first images may have different viewing angles. In other words, upon acquiring these first images, the image acquiring unit or image acquiring apparatus may have different positions and orientations. In these application scenarios, triangulation may be employed to determine the three-dimensional coordinates of respective feature points to thereby complete reconstruction of the to-be-determined planar surface. In other words, for a certain feature point, if this feature point is included in both first images, and the poses (position and orientation) of the image acquiring unit or image acquiring apparatus are also known when acquiring the two first images, the locations of the image acquiring unit or image acquiring apparatus upon the two acquisitions of the first images are used as two vertices of a triangle, while the feature point is used as the third vertex of the triangle. Because the locations and the orientations of the image acquiring unit or image acquiring apparatus are known (i.e., the locations of the two vertices of the triangle and the length of the triangle edge formed by the two vertices are known, so are the angles between this edge and its two neighboring edges), it is apparent that the location of the feature point as the third vertex may be uniquely determined.

Figure 3:
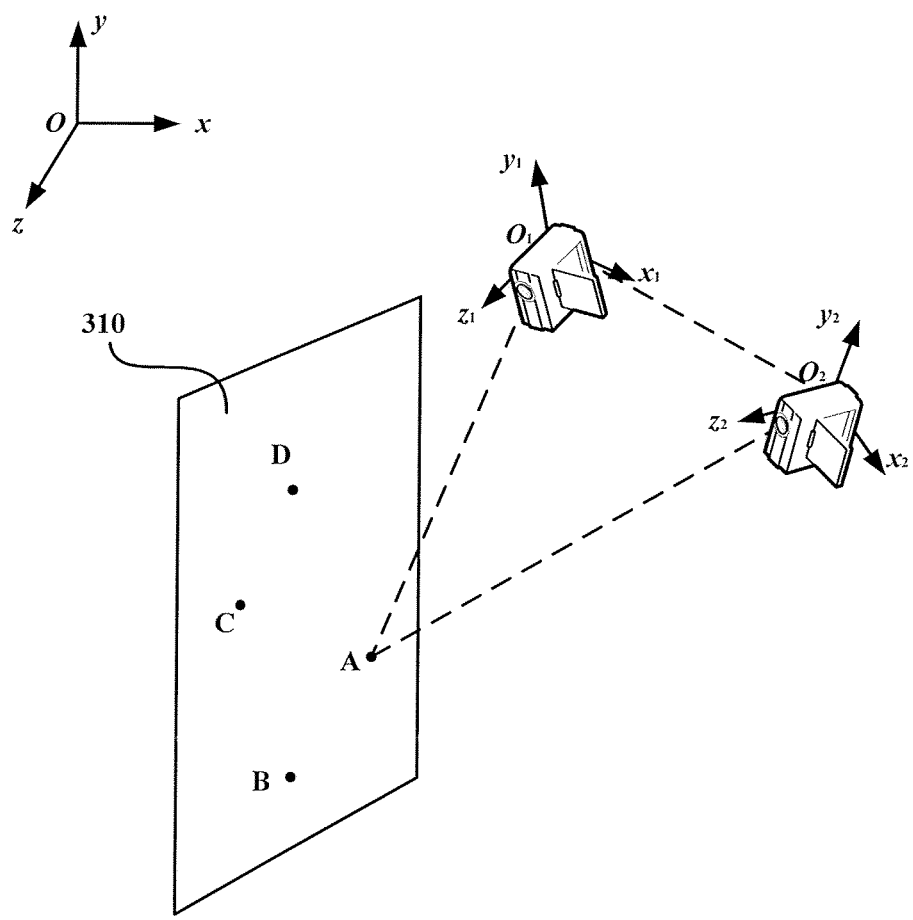
FIG. 3 is a schematic diagram of triangulation.

For example, FIG. 3 shows a schematic diagram of triangulation. Points A~D are feature points added on the to-be-determined planar surface 310. With the added feature point A as an example, the image acquiring apparatus or image acquiring unit has acquired the images (i.e., first images) including the feature point A at location $O_1$ and location $O_2$. Here, the location $O_1$ and the location $O_2$ may be represented by their coordinate values in a pre-established three-dimensional Cartesian coordinate system (e.g., Oxyz coordinate system in FIG. 3). The location $O_1$ may be represented by coordinate value of the origin $O_1$ of a machine body coordinate system $O_1x_1y_1z_1$ of the image acquiring apparatus or image acquiring unit at the location in the Oxyz coordinate system. Similarly, the location $O_2$ may be represented by coordinate value of the origin $O_2$ of a machine body coordinate system $O_2x_2y_2z_2$ of the image acquiring apparatus or image acquiring unit at the location in the Oxyz coordinate system.

Besides, by determining the orientations of the image acquiring apparatus or the image acquiring unit at the location $O_1$ and the location $O_2$, the viewing angles thereof at the location $O_1$ and the location $O_2$ may be determined. In this way, for the triangle $O_1O_2A$ in FIG. 3, because the coordinate values of point $O_1$ and point $O_2$ in the Oxyz coordinate system are known, the length of the edge $O_1O_2$ may be obtained by computing the distance between the point $O_1$ and the point $O_2$. On the other hand, because the orientations of the image acquiring apparatus or image acquiring unit are known at the location $O_1$ and the location $O_2$, $\angle AO_1O_2$ and $\angle AO_2O_1$ may also be derived through calculation. It is apparent that the coordinate value of point A in the Oxyz coordinate system may be uniquely determined.

In a similar fashion, the coordinate values of the feature points B, C, and D in the to-be-determined planar surface under the Oxyz coordinate system may also be uniquely determined. In this way, the plane equation of the to-be-determined planar surface 310 may be solved, such that the to-be-determined planar surface 310 may be reconstructed to obtain the position and orientation of the planar surface 310.

According to the method for determining a planar surface in this embodiment, firstly, first prompt information is generated when the number of feature points belonging to a to-be-determined planar surface is smaller than a preset threshold, to thereby prompt a user to add feature points on the to-be-determined planar surface; then, at least two first images including the added feature points are obtained, based on which first images, the to-be-determined planar surface is reconstructed to determine the position and orientation of the to-be-determined planar surface. In this way, for a weakly-textured or texture-less planar surface, by adding feature points on such a surface, the position and orientation of the planar surface may be determined based on these added feature points, thereby completing reconstruction of the planar surface.

It may be understood that if the number of feature points belonging to the to-be-determined planar surface in the first images including the added feature points as obtained in step 204 is still smaller than the preset number threshold, the process may return to step 203 of this embodiment to re-generate the first prompt information to thereby prompt the user to further add feature points on the planar surface.

Figure 4:
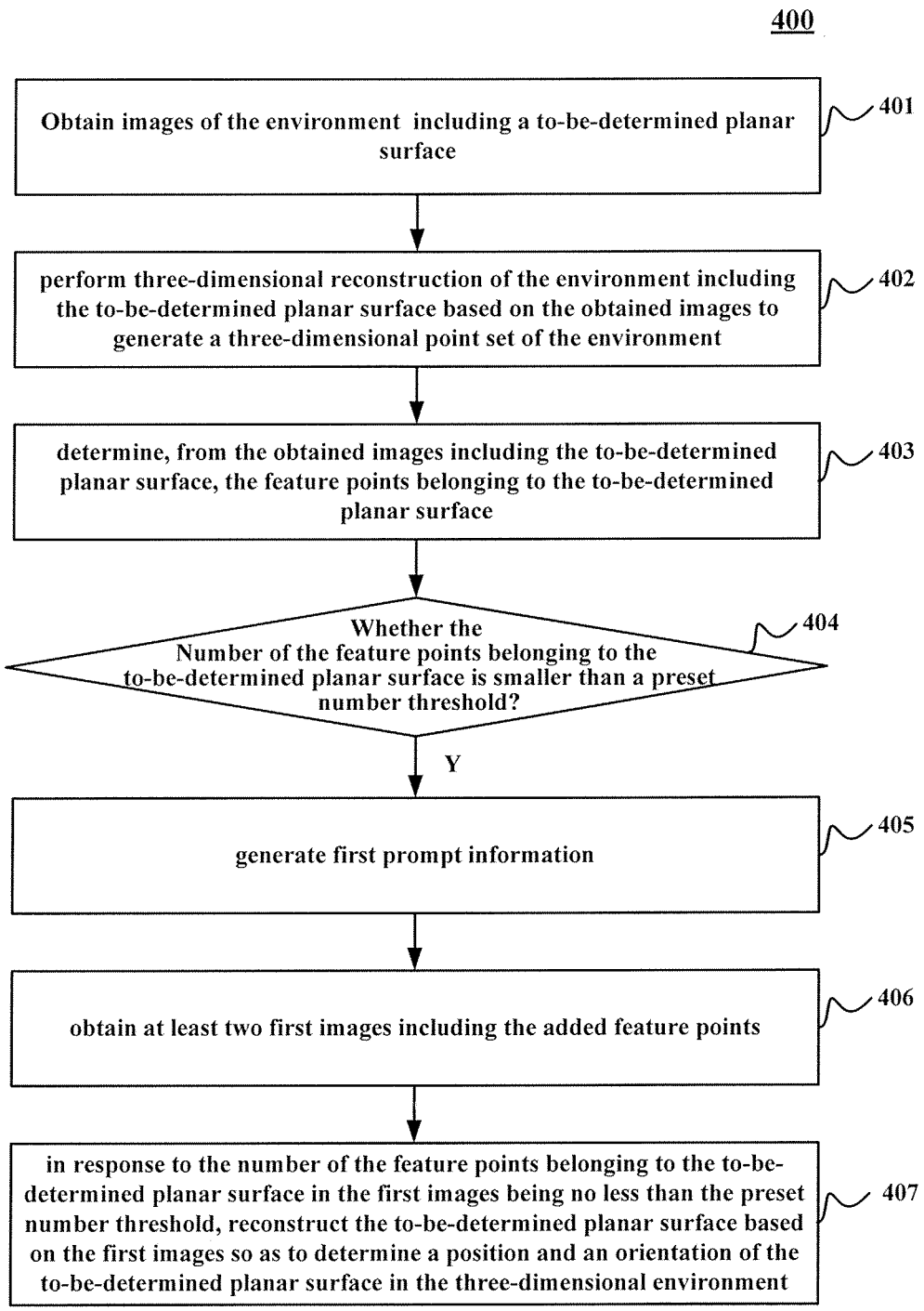
FIG. 4 is a flow chart of another embodiment of a method for determining a planar surface according to the present disclosure.

Further refer to FIG. 4, which shows a flow 400 of another embodiment of the method for determining a planar surface. The flow 400 of the method for determining a planar surface comprises steps of:

Step 401: obtaining images of the environment, wherein at least two of the obtained images includes a to-be-determined planar surface.

In some application scenarios, the to-be-determined planar surface may be a desk top in a certain room. In some application scenarios, images of the room may be acquired using an image acquiring apparatus or an image acquiring unit, and in the images acquired by the image acquiring apparatus or image acquiring unit, at least one image includes the desk top.

Step 402: performing three-dimensional reconstruction of the environment including the to-be-determined planar surface based on the obtained images to generate a three-dimensional point set of the environment.

In some optional implementation manners, when performing three-dimensional reconstruction of an environment including the to-be-determined planar surface, for example, the triangulation approach shown in FIG. 3 may be used to determine locations of respective feature points in the environment and finally determine the locations of respective objects (e.g., lamp, ground surface, desks, and other objects) in the room based on the locations of these feature points.

Specifically, for example, firstly, for each feature point in the three-dimensional environment, at least two images including the feature point may be determined. Next, poses (position and orientation) of the image acquiring apparatus in the three-dimensional environment upon acquiring the at least two images may be determined. Finally, a location of the feature point in the three-dimensional environment is determined based on the poses (position and orientation) of the image acquiring apparatus in the three-dimensional environment upon acquiring the at least two images, e.g., coordinate value of the feature point in the preset Cartesian coordinate system. Here, the feature points with determined location can be used as an element in the three dimensional point set of the three-dimensional environment.

Step 403: determining, from the obtained images including the to-be-determined planar surface, the feature points belonging to the to-be-determined planar surface.

Step 404: judging whether the number of the feature points belonging to the to-be-determined planar surface is smaller than a preset number threshold.

Step 405: if yes, generating first prompt information that is configured for prompting a user to add feature points on the to-be-determined planar surface.

Step 406: obtaining at least two first images including the added feature points.

The steps 403~406 may be executed in a similar way like steps 201~204 in the embodiment shown in FIG. 2, which will not be detailed here.

Step 407: in response to the number of the feature points belonging to the to-be-determined planar surface in the first images being no less than the preset number threshold, reconstructing the to-be-determined planar surface based on the first images so as to determine a location and an orientation of the to-be-determined planar surface in the three-dimensional environment.

By reconstructing the to-be-determined planar surface and determining the location and orientation of the planar surface in the three-dimensional environment, a relative positional relationship between the planar surface and other objects in the three-dimensional environment may be determined.

In some application scenarios, when the solution of this embodiment is applied to the field of augmented reality, because the three-dimensional environment including the to-be-determined planar surface may be reconstructed through the solution of this embodiment, a digital image (e.g., a rendered image corresponding to a certain three dimensional object) generated by the device may be added on the reconstructed planar surface using augmented reality, and because the location and orientation of the reconstructed planar surface has a higher accuracy, the digital image generated by the device will be in exact alignment with where they actually are in the environment. For example, the reconstructed planar surface is a desk top, while the digital image created by the device is a TV set. With the augmented reality technology, the TV set may be properly "placed" on the desk top, just like a real TV set being placed on a real desk top.

It may be seen from FIG. 4 that compared with the embodiment corresponding to FIG. 2, the flow 400 of the method for determining a planar surface in the embodiment provides an additional step of reconstructing the three-dimensional environment including the to-be-reconstructed planar surface. In this way, the solution described in this embodiment may further determine relative positional relationships between the to-be-reconstructed planar surface and other objects in the three-dimensional environment, such that the three-dimensional environment including the to-be-reconstructed planar surface may be reconstructed more accurately.

In some optional implementation manners of this embodiment, after the step 402 of performing three-dimensional reconstruction to the environment including the to-be-determined planar surface based on the obtained images so as to generate the three-dimensional representation of the environment, the method of this embodiment may further comprise:

generating second prompt information. Here, the second prompt information is configured for prompting the user to move the image acquiring apparatus for acquiring the images towards the to-be-determined planar surface.

In some application scenarios, the electronic device on which the method for determining a planar surface in this embodiment is executed is a terminal device shown in FIG. 1; when executing the step 401 of obtaining the images of the environment and the step 402 of performing three-dimensional reconstruction of an environment including the to-be-determined planar surface based on the obtained images to generate a three-dimensional representation of the environment, the user may hold the terminal device and move in the environment to acquire images from different locations and viewing angles using the image acquiring unit (e.g., a camera) of the terminal device. In these application scenarios, after generating the three-dimensional reconstruction of the environment including the to-be-reconstructed planar surface, the terminal device may further prompt the user to move the image acquiring unit closer to the to-be-determined planar surface, so as to determine the feature points belonging to the planar surface from the to-be-determined planar surface.

In some optional implementation manners of this embodiment, the step 407 of in response to the number of the feature points belonging to the to-be-determined planar surface in the first images being no less than the preset number threshold, reconstructing the to-be-determined planar surface based on the first images so as to determine a location and orientation of the to-be-determined planar surface in the three-dimensional environment, may be further implemented through the following steps:

Step 4071: determining 3D coordinates of the feature points in the three-dimensional environment. In some application scenarios, for example, the 3D coordinates of the feature points in the three-dimensional environment may be determined using the triangulation approach described in FIG. 3.

And step 4072: determining a plane equation of the to-be-determined planar surface using a preset algorithm based on the 3D coordinates of the feature points.

Generally, the plane equation has the following expression:

$$ax+by+cz+d=0 \qquad (1)$$

where a, b, c, and d are constants, and x, y and z are coordinate values of any point on the planar surface in the preset Cartesian coordinate system.

when d≠0, let a'=−a/d, c'=−c/d, the plane equation shown in equation (1) may be converted as:

$$a'x+b'y+c'z=1 \qquad (2)$$

Here, the preset algorithm may include any one of: Least Squares approach, Random Sample Consensus algorithm, and 3-D Kernel-based Hough Transform algorithm.

Through the preset algorithm, the specific values of a', b' and c' may be obtained. In this way, for any point in the three-dimensional environment, whether the point is located within the planar surface may be determined by judging whether its coordinate values satisfy the equation (2), or with an error smaller than a threshold.

In some optional implementation manners of this embodiment, the step 4071 of determining 3D coordinates of the added feature points in the three-dimensional environment may further comprise:

determining pose (position and orientation) of the image acquiring apparatus in the three-dimensional environment using a visual inertial odometry (VIO); and determining 3D coordinates of the added feature points in the three-dimensional environment based on the poses of the image acquiring apparatus in the three-dimensional environment.

The VIO may exploit both visual odometry and inertial odometry to determine the pose of the image acquiring apparatus; they may complement each other and improve each other. Therefore, compared with a pure visual odometry or a pure inertial odometry, the VIO has a higher accuracy and a wider array of application scenarios.

For example, in some application scenarios, the image acquired by the image acquiring apparatus is a weakly-textured or texture-less planar surface. At this point, it would be impossible to determine the feature points from the image. If the pose of the image acquiring apparatus is determined only through visual odometry, then it would be impossible to determine the current pose of the image acquiring apparatus. In these application scenarios, with the VIO, the current pose of the image acquiring apparatus may be determined using the inertial odometry; in this way, the 3D coordinates of the feature points in the three-dimensional environment may be further determined through triangulation, and then the plane equation of the to-be-determined planar surface is determined.

In some optional implementation manners of the method for determining a planar surface in various embodiments of the present disclosure, the first prompt information is configured for prompting the user to attach a planar object to the to-be-determined planar surface so as to add feature points on the to-be-determined planar surface. Here, the planar object for example may refer to any object with a thickness that may be neglected relative to its surface area and with rich features, which includes, but not limited to, a credit card, a business card, a picture drawn on paper, a leaflet, etc.

For example, in some application scenarios of these optional implementation manners, the first prompt information may refer to prompt information characterizing the content "please place a card on the planar surface." This prompt information may be rendered in a text form on a screen of the terminal device used by the user, and/or, the prompt information may be played through a voice play unit of the terminal device or a voice play device (e.g., a speaker) in communicative connection with the terminal device.

In some other optional implementation manners of the method for determining a planar surface according to various embodiments of the present disclosure, the first prompt information may also be used for prompting the user to attach his/her hand to the to-be-determined planar surface so as to use the points corresponding to the features of the hand (e.g., fingertips) as the added feature points. It may be understood that when the user's hand is attached to the to-be-determined planar surface, the feature points corresponding to the features of the hand (e.g. fingertips) may be approximately determined as the feature points on the to-be-determined planar surfaces. Besides, in these optional implementation manners, when the user attaches his/her hand to the to-be-determined planar surface, the electronic device on which the method for determining a planar surface is executed may use those feature points with prior knowledge of fingertip characteristics in the acquired first images as the feature points for reconstructing the to-be-determined planar surface. For example, five fingertips can be located on each of the first images. In this way, it may avoid to mistakenly use feature points of other parts (e.g., the back of the hand) of the user's hand for reconstructing the to-be-determined planar surface; as such, the accuracy of reconstructing the planar surface may be enhanced.

Figure 5:
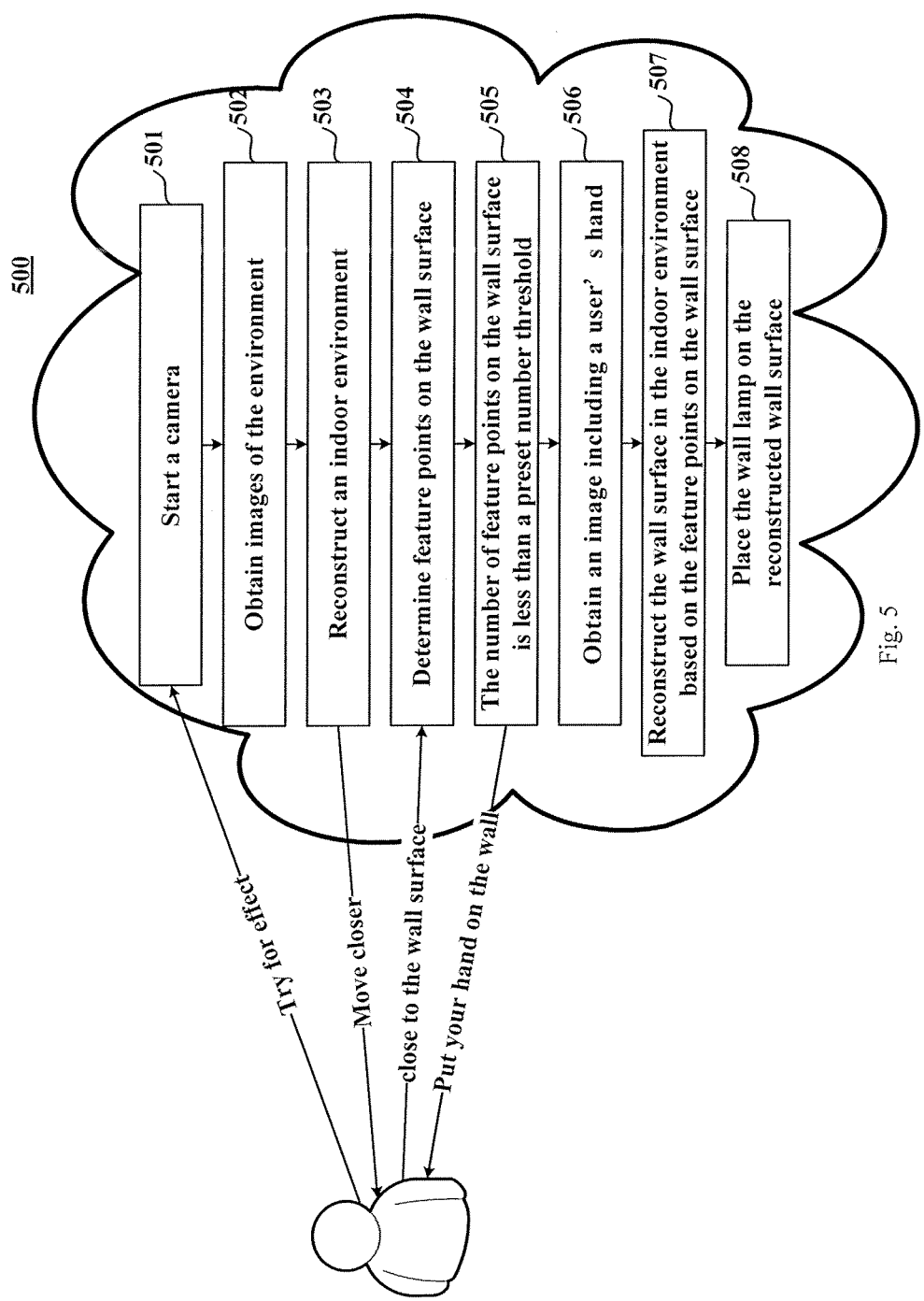
FIG. 5 is a schematic diagram of an application scenario for a method for determining a planar surface according to the present disclosure.

Hereinafter, FIG. 5 will be referenced to further illustrate the method of the present disclosure. FIG. 5 is a schematic diagram 500 of an application scenario of the method for determining a planar surface according to the present disclosure.

Figure 6:
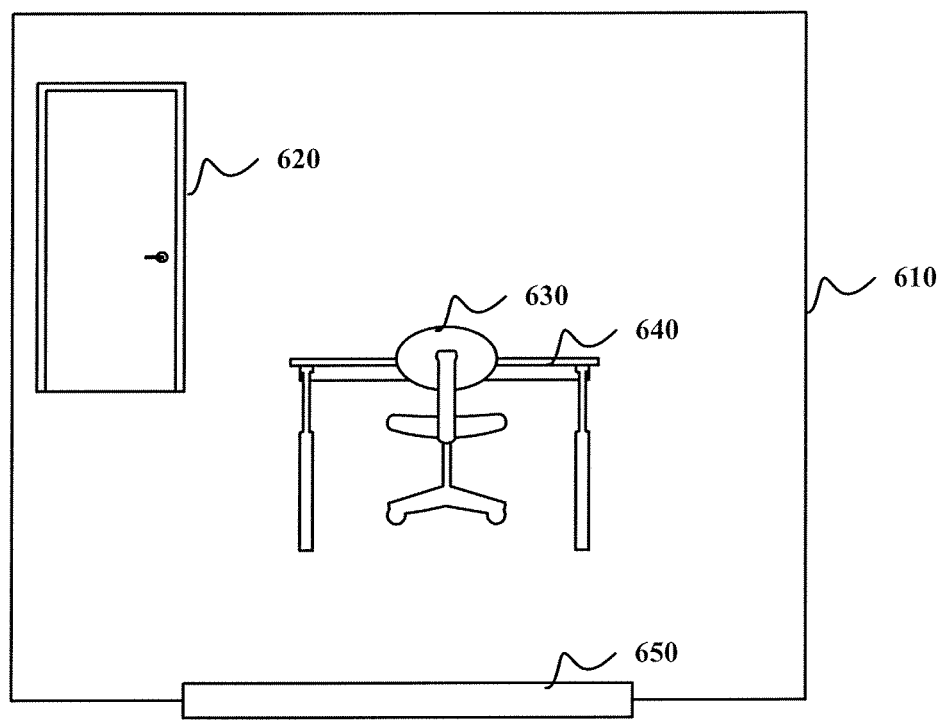
FIG. 6 is a schematic diagram of an indoor environment including a to-be-reconstructed plane.

In the application scenario shown in FIG. 5, supposing a user wants to buy a wall lamp to be mounted on a wall surface 610 of the room 600 shown in FIG. 6. Before determining to buy, the user expects to exploit the method for determining a planar surface according to the present disclosure to preview the effect after the wall lamp is mounted.

Firstly, the user may click a widget "try for the effect" preset on a product detail page of a certain wall lamp on a certain shopping application or shopping website to open an image acquiring apparatus (e.g., a camera) on the terminal device (e.g., a mobile phone) where the user performs online shopping, as denoted by the reference sign 501.

Next, the user may hold the mobile phone to acquire a plurality of images of the indoor space through the camera, as denoted by the reference sign 502.

Then, the indoor space may be subjected to three-dimensional reconstruction based on the acquired images, thereby determining a door 620, a chair 630, a desk 640, and a window 650, etc., in FIG. 6, as denoted by the reference sign 503.

Next, because the user intends to mount the wall lamp on the wall surface 610, the terminal device may issue prompt information "move closer" to the user to expect to obtain an accurate reconstruction of the wall surface 610. After receiving the prompt information "move closer," the user may move the camera towards the direction of the wall surface 610.

Next, as denoted by the reference sign 505, if it is determined that the number of feature points on the wall surface 610 is smaller than a preset number threshold, it is likely impossible to complete reconstruction of the wall surface. At this point, prompt information "please put your hand on the wall" may be sent to the user.

Next, the user may adjust the position of the camera to cause the camera to acquire images when his/her hand is placed firmly on the wall surface 610. For example, the user may hold the mobile phone with one hand, while attach his/her other hand firmly onto the wall face 610. The hand holding the mobile phone may control the mobile phone to move, thereby acquiring images of the hand placed firmly on the wall face 610 from a plurality of view angles, as denoted by reference sign 506.

Then, the wall surface 610 may be reconstructed based on the locations of the feature points corresponding to the fingertips, thereby determining the location and orientation of the wall surface in the indoor space, as denoted by the reference sign 507.

Finally, a digital image of the wall lamp generated by rendering a 3D digital model of the wall lamp, may be "placed" on the reconstructed wall surface using the augmented reality technology, such that the user may be able to preview the effect after the wall lamp is mounted before physically purchasing the product.

Figure 7:
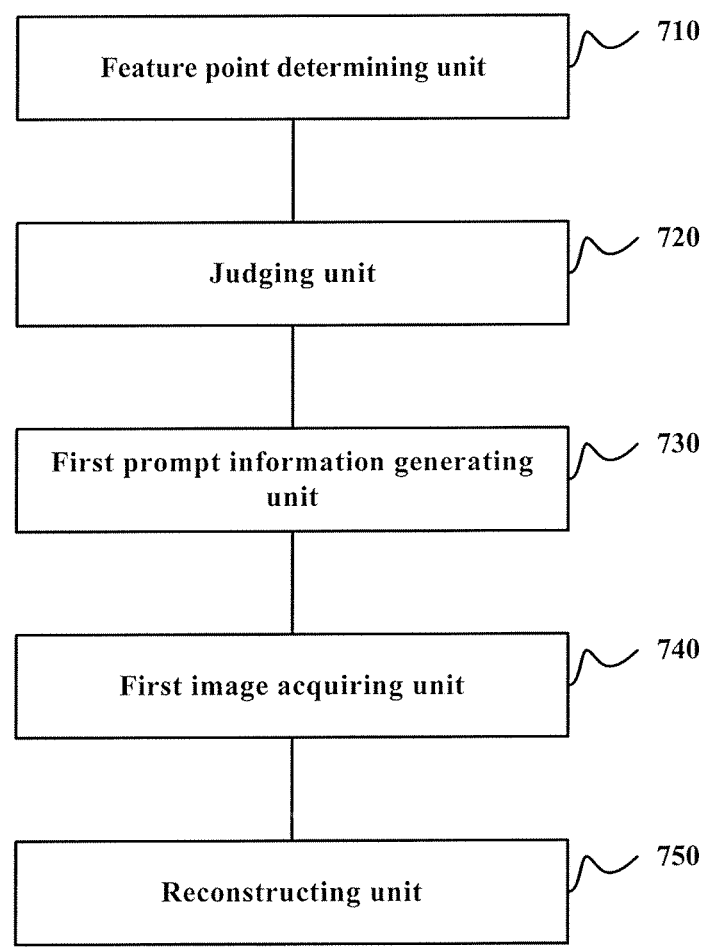
FIG. 7 is a structural schematic diagram of an embodiment of an apparatus for determining a planar surface according to the present disclosure.

Further referring to FIG. 7, as an implementation of the methods shown in the figures above, the present disclosure provides an embodiment of an apparatus for determining a planar surface. The apparatus embodiment corresponds to the method embodiment shown in FIG. 2. The apparatus may be specifically applied to various kinds of electronic devices.

The apparatus for determining a planar surface according to this embodiment comprises a feature point determining unit 710, a judging unit 702, a first prompt information generating unit 730, a first images acquiring unit 740, and a reconstructing unit 750.

Specifically, the feature point determining unit 710 is configurable for determining, from obtained images of the environment that include a to-be-determined planar surface, feature points belonging to the to-be-determined planar surface.

The judging unit 720 is configurable for judging whether the number of the feature points belonging to the to-be-determined planar surface is smaller than a preset number threshold.

The first prompt information generating unit 730 is configurable for, if the number of the feature points belonging to the to-be-determined planar surface is smaller than the preset number threshold, generating first prompt information for prompting a user to add feature points on the to-be-determined planar surface.

The first images acquiring unit 740 is configurable for obtaining first images including the added feature points.

A reconstructing unit 750 is configurable for, in response to the number of the feature points belonging to the to-be-determined planar surface in the first images being no less than the preset number threshold, reconstructing the to-be-determined planar surface based on the first images so as to determine a location and an orientation of the to-be-determined planar surface.

In some optional implementation manners, the apparatus for determining a planar surface according to the present embodiment may further comprise an image acquiring unit (not shown) and a three-dimensional reconstructing unit (not shown).

In these optional implementation manners, the image acquiring unit is configurable for, before determining, from obtained images of the environment that include a to-be-determined planar surface, feature points belonging to the to-be-determined planar surface, obtaining the images, wherein at least one of the obtained images includes the to-be-determined planar surface.

The three-dimensional reconstructing unit is configurable for performing three-dimensional reconstruction of an environment including the to-be-determined planar surface based on the obtained images so as to generate a three-dimensional reconstruction of the environment.

In these optional implementation manners, the reconstructing unit 750 is further configurable for, in response to the number of the feature points belonging to the to-be-determined planar surface in the first images being no less than the preset number threshold, reconstructing the to-be-determined planar surface based on the first images so as to determine a location and orientation of the to-be-determined planar surface in the three-dimensional environment.

In some optional implementation manners, the apparatus for determining a planar surface according to this embodiment may further comprise a second prompt information generating unit (not shown). In these optional implementation manners, the second prompt information generating unit is configurable for, after performing three-dimensional reconstruction to an environment including the to-be-determined planar surface based on the obtained images so as to generate a three-dimensional reconstruction of the environment, generating second prompt information for prompting the user to move an image acquiring apparatus for acquiring the images towards a direction approaching the to-be-determined planar surface.

In some optional implementation manners, the reconstructing unit 750 is further configurable for: determining 3D coordinates of the feature points in the three-dimensional environment; and determining a plane equation of the to-be-determined planar surface using a preset algorithm based on the 3D coordinates of the feature points.

In some optional implementation manners, the preset algorithm includes any one of: Least Squares approach, Random Sample Consensus algorithm, and 3-D Kernel-based Hough Transform algorithm.

In some optional implementation manners, upon determining the 3D coordinates of the added feature points in the three-dimensional environment, the reconstructing unit 750 is further configurable for: determining a pose (position and orientation) of the image acquiring apparatus in the three-dimensional environment using the Visual Inertial Odometry (VIO); and determining the 3D coordinates of the feature points in the three-dimensional environment based on the poses of the image acquiring apparatus in the three-dimensional environment.

In some optional implementation manners, the three-dimensional reconstructing unit is further configurable for: determining, for each feature point in the three-dimension environment, at least two images including the feature point; determining the poses of the image acquiring apparatus in the three-dimensional environment upon acquiring the at least two images; determining the locations of the feature points in the three-dimensional environment based on the poses of the image acquiring apparatus in the three-dimensional environment upon acquiring the at least two images.

In some optional implementations, the first prompt information generated by the first prompt information generating unit 730 is configurable for prompting the user to attach a planar object to the to-be-determined planar surface so as to add feature points on the to-be-determined planar surface.

Or, in some other optional implementation manners, the first prompt information generated by the first prompt information generating unit 730 is configurable for prompting the user to attach a hand of the user to the to-be-determined planar surface so as to use points corresponding to hand features (e.g., finger tips) as the added feature points.

Hereinafter, refer to FIG. 8, which is a structural schematic diagram of a computer system 800 suitable for implementing an electronic device according to an embodiment of the present disclosure. The apparatus shown in FIG. 8 is only an example, which should not bring any limitation to the function and use scope of the embodiments of the present disclosure.

Figure 8:
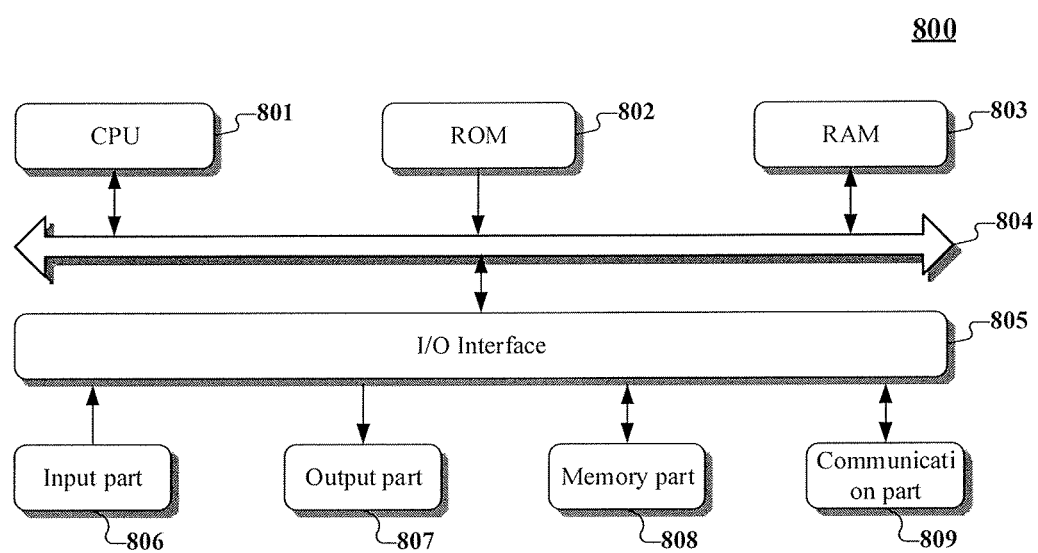
FIG. 8 is a structural schematic diagram of a computer system suitable for implementing an electronic device according to an embodiment of the present disclosure.

As shown in FIG. 8, the computer system 800 comprises a central processing unit (CPU) 801 which may perform various kinds of appropriate actions and processing based on a computer program stored in a read-only memory (ROM) 802 or computer program loaded into the random-access memory (RAM) 803 from a memory part 808. In RAM 803, there may also store various kinds of programs and data needed for operations of the system 800. CPU 801, ROM 802, and RAM 803 are connected with each other via a bus 804. The input/output (I/O) interface 805 may also be connected to the bus 804.

In some optional implementation manners, CPU 801 includes one or more processors (not shown).

The following components are connected to the I/O interface 805, including: an input part 806 including such as an image acquiring apparatus; an output part 807 including such as a loudspeaker, etc.; a memory part 808 including a hard disk, etc.; and a communication part 809 including a network interface card such as a LAN (Local Area Network) card, a modem, etc. The communication part 809 performs communication processing via a network such as the Internet.

In some optional implementation manners, the computer system may further comprise a pose determining unit (not shown). The pose determining unit is configurable for determining a pose (position and orientation) of the image acquiring apparatus. The pose determining unit for example may include a visual inertial odometry (VIO) system using visual sensors and inertial sensors.

In some optional implementation manners, before determining, from obtained images of the environment that include a to-be-determined planar surface, feature points belonging to the to-be-determined planar surface, the one or more processors are further configured for, obtaining the images of the environment, wherein at least two of the obtained images of the environment includes the to-be-determined planar surface; performing three-dimensional reconstruction of the environment including the to-be-determined planar surface based on the obtained images so as to generate a three-dimensional point set of the environment; and in response to the number of feature points belonging to the to-be-determined planar surface in the first images being no less than the preset number threshold, reconstructing the to-be-determined planar surface based on the first images so as to determine a position and an orientation of the to-be-determined planar surface in the three-dimensional environment.

In some optional implementation manners, after performing three-dimensional reconstruction of an environment including the to-be-determined planar surface based on the obtained images of the environment so as to generate a three-dimensional point set of the environment, the one or more processors are further configured for, after performing three-dimensional reconstruction of an environment including the to-be-determined planar surface based on the obtained images of the environment so as to generate a three-dimensional point set of the environment, generating second prompt information for prompting the user to move an image acquiring apparatus for acquiring images along the direction towards the to-be-determined planar surface.

In some optional implementation manners, response to the number of the feature points belonging to the to-be-determined planar surface in the first images being no less than the preset number threshold, reconstructing the to-be-determined planar surface based on the first images so as to determine a position and an orientation of the to-be-determined planar surface, the one or more processors are further configured for, determining 3D coordinates of the feature points in the three-dimensional environment; and determining a plane equation of the to-be-determined planar surface using a preset algorithm based on the 3D coordinates of the feature points.

In some optional implementation manners, the preset algorithm includes any one of: Least Squares approach, Random Sample Consensus algorithm, and 3-D Kernel-based Hough Transform algorithm.

In some optional implementation manners, when determining 3D coordinates of the feature points in the three-dimensional environment, the one or more processors are further configured for, determining position and orientation of the image acquiring apparatus in the three-dimensional environment using the Visual Inertial Odometry; and determining the 3D coordinates of the feature points in the three-dimensional environment based on the position and orientation of the image acquiring apparatus in the three-dimensional environment.

In some optional implementation manners, when performing three-dimensional reconstruction of an environment including the to-be-determined planar surface based on the obtained images of an environment so as to generate a three-dimensional point set, the one or more processors are further configured for, determining, for each feature point in the three-dimensional environment, at least two images including the feature point; determining the orientations of the image acquiring apparatus and the positions of the image acquiring apparatus in the three-dimensional environment upon acquiring the at least two images; and determining the location of the feature point in the three-dimensional environment based on the orientations of the image acquiring apparatus and the positions of the image acquiring apparatus in the three-dimensional environment upon acquiring the at least two images.

In some optional implementation manners, the first prompt information is configured for prompting the user to attach a planar object to the to-be-determined planar surface so as to add feature points on the to-be-determined planar surface.

In some optional implementation manners, the first prompt information is configured for prompting the user to attach a hand of the user to the to-be-determined planar surface so as to use points on the hand of the user as the added feature points. In some optional implementation manners, the points on the hand of the user can be finger tips.

Particularly, according to the embodiments of the present disclosure, the processes described above with reference to the flow diagrams may be implemented as computer software programs. For example, an embodiment of the present disclosure includes a computer program product that has a computer program carried on a computer-readable medium, the computer program containing computer codes for executing the methods shown in the flow diagrams. In such an embodiment, the computer programs may be downloaded and installed from a network through the communication part 809 and/or installed from the removable medium (not shown). When being executed by the central processing unit (CPU) 801, the computer programs execute the functions limited in the methods of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program code are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device or used in combination therewith. The program code embodied on the computer-readable medium may be transmitted using any appropriate medium, including, but not limited to: wireless, wired, cable, RF, etc., or any appropriate combination thereof.

One or more programming languages or a combination thereof may be used to compile the computer program codes for executing the operations in the present disclosure. The programming languages include object-oriented programming languages (such as Java, Smalltalk, C++), and also include conventional procedural programming languages (such as "C" language or similar programming languages). The program code may be completely executed on a user computer, partially executed on the user computer, executed as an independent software packet, or partially executed on the user computer while partially executed on the remote computer, or completely executed on the remote computer or the server. In a scene associated with a remote computer, the remote computer may be connected to the user computer via any kind of network (including a local area network (LAN) or a wide area network (WAN), or may be connected to the external computer (for example, connected via the Internet through an Internet Service Provider).

The flow diagrams and block diagrams in the drawings illustrate system architectures, functions, and operations possibly implemented by the system, method, and computer program product of various embodiments of the present disclosure. At this point, each block in the flow diagrams or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks actually may be executed substantially in parallel, and they may be sometimes executed in a reverse order, dependent on the functions involved. It should also be noted that each block in the block diagrams and/or flow diagrams and a combination of blocks in the block diagrams and/or flow diagrams may be implemented by a specific hardware-based system for executing a prescribed function or operation, or may be implemented by a combination of specific hardware and computer instructions.

The units mentioned in the description of the embodiments of the present disclosure may be implemented in a software manner or in a hardware manner. The described units may be disposed in a processor, for example may be described as: a processor comprising a feature point determining unit, a judging unit, a first prompt information generating unit, a first images acquiring unit, and a reconstructing unit. Particularly, names of these units do not constitute limitations to those units. For example, the feature point determining unit may also be described as "a unit for: i determining, from obtained images that include a to-be-determined planar surface, feature points belonging to the to-be-determined planar surface."

In another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: determining, from obtained images that include a to-be-determined planar surface, feature points belonging to the to-be-determined planar surface; judging whether the number of the feature points belonging to the to-be-determined planar surface is smaller than a preset number threshold; if yes, generating first prompt information for prompting a user to add feature points on the to-be-determined planar surface; obtaining a first images including the added feature points; and in response to the number of the feature points belonging to the to-be-determined planar surface in the first images being no less than the preset number threshold, reconstructing the to-be-determined planar surface based on the first images so as to determine a location and an orientation of the to-be-determined planar surface.

In some optional implementation manners, before determining, from obtained images of the environment that include a to-be-determined planar surface, feature points belonging to the to-be-determined planar surface, the method further comprises: obtaining the images of the environment, wherein at least two of the obtained images of the environment include the to-be-determined planar surface; performing three-dimensional reconstruction of the environment including the to-be-determined planar surface based on the obtained images so as to generate a three-dimensional point set of the environment; and in response to the number of the feature points belonging to the to-be-determined planar surface in the first images being no less than the preset number threshold, reconstructing the to-be-determined planar surface based on the first images so as to determine a position and an orientation of the to-be-determined planar surface, comprises: in response to the number of the feature points belonging to the to-be-determined planar surface in the first images being no less than the preset number threshold, reconstructing the to-be-determined planar surface based on the first images so as to determine a position and an orientation of the to-be-determined planar surface in the three-dimensional environment.

In some optional implementation manners, after performing three-dimensional reconstruction of an environment including the to-be-determined planar surface based on the obtained images of the environment so as to generate a three-dimensional point set of the environment, the method further comprises: generating second prompt information for prompting the user to move an image acquiring apparatus for acquiring images along the direction towards the to-be-determined planar surface.

In some optional implementation manners, in response to the number of the feature points belonging to the to-be-determined planar surface in the first images being no less than the preset number threshold, reconstructing the to-be-determined planar surface based on the first images so as to determine a position and an orientation of the to-be-determined planar surface, comprises: determining 3D coordinates of the feature points in the three-dimensional environment; and determining a plane equation of the to-be-determined planar surface using a preset algorithm based on the 3D coordinates of the feature points.

In some optional implementation manners, the preset algorithm includes any one of: Least Squares approach, Random Sample Consensus algorithm, and 3-D Kernel-based Hough Transform algorithm.

In some optional implementation manners, determining 3D coordinates of the feature points in the three-dimensional environment comprises: determining position and orientation of the image acquiring apparatus in the three-dimensional environment using the Visual Inertial Odometry (VIO); and determining the 3D coordinates of the feature points in the three-dimensional environment based on the position and orientation of the image acquiring apparatus in the three-dimensional environment.

In some optional implementation manners, performing three-dimensional reconstruction of an environment including the to-be-determined planar surface based on the obtained images of the environment so as to generate a three-dimensional point set of the three-dimensional environment, comprises: determining, for each feature point in the three-dimension environment, at least two images including the feature point; determining the orientation of the image acquiring apparatus and the position of the image acquiring apparatus in the three-dimensional environment upon acquiring the at least two images; determining the location of the feature point in the three-dimensional environment based on the orientation of the image acquiring apparatus and the position of the image acquiring apparatus in the three-dimensional environment upon acquiring the at least two images.

In some optional implementation manners, the first prompt information is configured for prompting the user to attach a planar object to the to-be-determined planar surface so as to add feature points to the to-be-determined planar surface.

In some optional implementation manners, the first prompt information is configured for prompting the user to attach a hand of the user to the to-be-determined planar surface so as to use points on the hand of the user as the added feature points. In some optional implementation manners, the points on the hand of the user can be finger tips.

What have been described above are only preferred embodiments of the present disclosure and an illustration of the technical principle as exerted. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A method for determining a planar surface, comprising:
determining, from obtained images of the environment that include a to-be-determined planar surface, feature points belonging to the to-be-determined planar surface;
judging whether the number of the feature points belonging to the to-be-determined planar surface is smaller than a preset number threshold;
generating, in response to that the number of the feature points belonging to the to-be-determined planar surface is smaller than a preset number threshold, first prompt information for prompting a user to add feature points on the to-be-determined planar surface;
obtaining at least two first images including the added feature points; and
in response to the number of the feature points belonging to the to-be-determined planar surface in the first images being no less than the preset number threshold, reconstructing the to-be-determined planar surface based on the first images so as to determine a position and an orientation of the to-be-determined planar surface.

2. The method according to claim 1, wherein before determining, from obtained images of the environment that include a to-be-determined planar surface, feature points belonging to the to-be-determined planar surface, the method further comprises:
obtaining the images of the environment, wherein at least two of the obtained images of the environment includes the to-be-determined planar surface;
performing three-dimensional reconstruction of the environment including the to-be-determined planar surface based on the obtained images so as to generate a three-dimensional point set of the environment; and
in response to the number of the feature points belonging to the to-be-determined planar surface in the first images being no less than the preset number threshold, reconstructing the to-be-determined planar surface based on the first images so as to determine a position and an orientation of the to-be-determined planar surface, comprises:
in response to the number of feature points belonging to the to-be-determined planar surface in the first images being no less than the preset number threshold, reconstructing the to-be-determined planar surface based on the first images so as to determine a position and an orientation of the to-be-determined planar surface in the three-dimensional environment.

3. The method according to claim 2, wherein after performing three-dimensional reconstruction of an environment including the to-be-determined planar surface based on the obtained images of the environment so as to generate a three-dimensional point set of the environment, the method further comprises:
generating second prompt information for prompting the user to move an image acquiring apparatus for acquiring images along the direction towards the to-be-determined planar surface.

4. The method according to claim 3, wherein performing three-dimensional reconstruction of an environment including the to-be-determined planar surface based on the obtained images of an environment so as to generate a three-dimensional point set, comprises:
determining, for each feature point in the three-dimensional environment, at least two images including the feature point;
determining the orientations of the image acquiring apparatus and the positions of the image acquiring apparatus in the three-dimensional environment upon acquiring the at least two images; and
determining the location of the feature point in the three-dimensional environment based on the orientations of the image acquiring apparatus and the positions of the image acquiring apparatus in the three-dimensional environment upon acquiring the at least two images.

5. The method according to claim 2, wherein, in response to the number of the feature points belonging to the to-be-determined planar surface in the first images being no less than the preset number threshold, reconstructing the to-be-determined planar surface based on the first images so as to determine a position and an orientation of the to-be-determined planar surface, comprises:
determining 3D coordinates of the feature points in the three-dimensional environment; and
determining a plane equation of the to-be-determined planar surface using a preset algorithm based on the 3D coordinates of the feature points.

6. The method according to claim 5, wherein the preset algorithm includes any one of:
Least Squares approach, Random Sample Consensus algorithm, and 3-D Kernel-based Hough Transform algorithm.

7. The method according to claim 5, wherein determining 3D coordinates of the feature points in the three-dimensional environment comprises:
determining position and orientation of the image acquiring apparatus in the three-dimensional environment using a Visual Inertial Odometry; and
determining the 3D coordinates of the feature points in the three-dimensional environment based on the position and orientation of the image acquiring apparatus in the three-dimensional environment.

8. The method according to claim 1, wherein the first prompt information is configured for prompting the user to attach a planar object to the to-be-determined planar surface so as to add feature points on the to-be-determined planar surface.

9. The method according to claim 1, wherein:
the first prompt information is configured for prompting the user to attach a hand of the user to the to-bedetermined planar surface so as to use points on the hand of the user as the added feature points.

10. An electronic device, comprising:
an image acquiring apparatus for acquiring images;
one or more processors; and
a memory for storing one or more programs which, when being executed by the one or more processors, cause the one or more processors to implement the method comprising:
determining, from obtained images of the environment that include a to-be-determined planar surface, feature points belonging to the to-be-determined planar surface;
judging whether the number of the feature points belonging to the to-be-determined planar surface is smaller than a preset number threshold;
generating, in response to that the number of the feature points belonging to the to-be-determined planar surface is smaller than a preset number threshold, first prompt information for prompting a user to add feature points on the to-be-determined planar surface;
obtaining at least two first images including the added feature points; and
in response to the number of the feature points belonging to the to-be-determined planar surface in the first images being no less than the preset number threshold, reconstructing the to-be-determined planar surface based on the first images so as to determine a position and an orientation of the to-be-determined planar surface.

11. The device according to claim 10, further comprising a pose determining unit that is configured for determining a location and an orientation of the image acquiring apparatus.

12. The device according to claim 11, wherein the pose determining unit comprises a visual inertial odometry system that uses visual sensors and inertial sensors.

13. The device according to claim 11, wherein before determining, from obtained images of the environment that include a to-be-determined planar surface, feature points belonging to the to-be-determined planar surface, the one or more processors are further configured for,
obtaining the images of the environment, wherein at least two of the obtained images of the environment includes the to-be-determined planar surface;
performing three-dimensional reconstruction of the environment including the to-be-determined planar surface based on the obtained images so as to generate a three-dimensional point set of the environment; and
in response to the number of feature points belonging to the to-be-determined planar surface in the first images being no less than the preset number threshold, reconstructing the to-be-determined planar surface based on the first images so as to determine a position and an orientation of the to-be-determined planar surface in the three-dimensional environment.

14. The device according to claim 13, wherein after performing three-dimensional reconstruction of an environment including the to-be-determined planar surface based on the obtained images of the environment so as to generate a three-dimensional point set of the environment, the one or more processors are further configured for,
after performing three-dimensional reconstruction of an environment including the to-be-determined planar surface based on the obtained images of the environment so as to generate a three-dimensional point set of the environment, generating second prompt information for prompting the user to move an image acquiring apparatus for acquiring images along the direction towards the to-be-determined planar surface.

15. The device according to claim 14, wherein when performing three-dimensional reconstruction of an environment including the to-be-determined planar surface based on the obtained images of an environment so as to generate a three-dimensional point set, the one or more processors are further configured for,
determining, for each feature point in the three-dimensional environment, at least two images including the feature point;
determining the orientations of the image acquiring apparatus and the positions of the image acquiring apparatus in the three-dimensional environment upon acquiring the at least two images; and
determining the location of the feature point in the three-dimensional environment based on the orientations of the image acquiring apparatus and the positions of the image acquiring apparatus in the three-dimensional environment upon acquiring the at least two images.

16. The device according to claim 13, wherein in response to the number of the feature points belonging to the to-be-determined planar surface in the first images being no less than the preset number threshold, reconstructing the to-be-determined planar surface based on the first images so as to determine a position and an orientation of the to-be-determined planar surface, the one or more processors are further configured for,
determining 3D coordinates of the feature points in the three-dimensional environment; and
determining a plane equation of the to-be-determined planar surface using a preset algorithm based on the 3D coordinates of the feature points.

17. The device according to claim 16, wherein when determining 3D coordinates of the feature points in the three-dimensional environment, the one or more processors are further configured for,
determining position and orientation of the image acquiring apparatus in the three-dimensional environment using a Visual Inertial Odometry; and
determining the 3D coordinates of the feature points in the three-dimensional environment based on the position and orientation of the image acquiring apparatus in the three-dimensional environment.

18. A non-transitory computer-readable storage medium on which a computer program is stored, wherein the program, when being executed, implements the method comprising:
determining, from obtained images of the environment that include a to-be-determined planar surface, feature points belonging to the to-be-determined planar surface;
judging whether the number of the feature points belonging to the to-be-determined planar surface is smaller than a preset number threshold;
generating, in response to that the number of the feature points belonging to the to-be-determined planar surface is smaller than a preset number threshold, first prompt information for prompting a user to add feature points on the to-be-determined planar surface;
obtaining at least two first images including the added feature points; and
in response to the number of the feature points belonging to the to-be-determined planar surface in the first images being no less than the preset number threshold, reconstructing the to-be-determined planar surface based on the first images so as to determine a position and an orientation of the to-be-determined planar surface.

19. The non-transitory computer-readable storage medium according to claim 18, wherein before determining, from obtained images of the environment that include a to-be-determined planar surface, feature points belonging to the to-be-determined planar surface, the method further comprises:
    obtaining the images of the environment, wherein at least two of the obtained images of the environment includes the to-be-determined planar surface;
    performing three-dimensional reconstruction of the environment including the to-be-determined planar surface based on the obtained images so as to generate a three-dimensional point set of the environment; and
    in response to the number of the feature points belonging to the to-be-determined planar surface in the first images being no less than the preset number threshold, reconstructing the to-be-determined planar surface based on the first images so as to determine a position and an orientation of the to-be-determined planar surface, comprises:
        in response to the number of feature points belonging to the to-be-determined planar surface in the first images being no less than the preset number threshold, reconstructing the to-be-determined planar surface based on the first images so as to determine a position and an orientation of the to-be-determined planar surface in the three-dimensional environment.

20. The non-transitory computer-readable storage medium according to claim 19, wherein, in response to the number of the feature points belonging to the to-be-determined planar surface in the first images being no less than the preset number threshold, reconstructing the to-be-determined planar surface based on the first images so as to determine a position and an orientation of the to-be-determined planar surface, comprises:
    determining 3D coordinates of the feature points in the three-dimensional environment; and
    determining a plane equation of the to-be-determined planar surface using a preset algorithm based on the 3D coordinates of the feature points.

* * * * *